United States Patent [19]
Ikenoya et al.

[11] Patent Number: 4,499,724
[45] Date of Patent: Feb. 19, 1985

[54] EXHAUST GAS CLEANING DEVICE FOR INTERNAL COMBUSTION ENGINE OF MOTORCYCLE

[75] Inventors: Yasuo Ikenoya, Kawagoe; Shuso Ueda, Asaka; Masafumi Araki, Kawagoe, all of Japan

[73] Assignee: Honda Giken Kogyo Kabushiki Kaisha, Tokyo, Japan

[21] Appl. No.: 421,427

[22] Filed: Sep. 22, 1982

[30] Foreign Application Priority Data

Dec. 18, 1981 [JP] Japan .................. 56-204709

[51] Int. Cl.³ ............................ F01N 3/22
[52] U.S. Cl. ...................... 60/290; 60/293
[58] Field of Search ........... 60/293, 290, 304, 305

[56] References Cited

U.S. PATENT DOCUMENTS 3,849,984  11/1974  Toda ..................... 60/290
3,919,843  11/1975  Arnaud ................. 60/289
4,014,169   3/1977  Umino .................. 60/290
4,165,611   8/1979  Ishikawa .............. 60/293

Primary Examiner—Douglas Hart
Attorney, Agent, or Firm—Armstrong, Nikaido, Marmelstein & Kubovcik

[57] ABSTRACT

An improved internal combustion engine for use with motorcycles including an intake system, an exhaust system, a starting aid such as a choke valve in the intake system for expediting the engine starting, and an exhaust gas cleaning device adapted to supply secondary air to the exhaust system for cleaning the exhaust gas flowing therethrough. The exhaust gas cleaning device comprises a secondary-air supply passage communicated with the exhaust system, a secondary-air control valve gear disposed in the intermediate part of the secondary-air supply passage and adapted to regulate the flow rate of the secondary air flowing through the supply passage, and a controller connected to the valve gear and adapted to close the same on detecting the operation of the starting aid and a vehicle speed below a set value.

4 Claims, 2 Drawing Figures

FIG.2

EXHAUST GAS CLEANING DEVICE FOR INTERNAL COMBUSTION ENGINE OF MOTORCYCLE

BACKGROUND OF THE INVENTION

1. Field of the Invention

The present invention relates to an exhaust gas cleaning device for an internal combustion engine of a motorcycle, adapted to supply the secondary air to the exhaust system of an internal combustion engine mounted on a motorcycle while controlling the supply so as to clean unburnt components in exhaust gas.

2. Description of the Prior Art

Such an exhaust gas cleaning means for an internal combustion engine of the above-mentioned type is generally known as adapted to supply the secondary air to the exhaust system of the engine in order to remove noxious components contained in the exhaust gas in the exhaust system. The exhaust gas cleaning means of this type, however, has such a disadvantage that when a motorcycle is driven while such a starting aid as a choke valve, a by-starter or the like is being actuated in warming-up of the engine, a relatively large amount of exhaust gas unburnt components, such as HC, CO and the like, discharged from the engine actively react with the secondary air supplied to the exhaust system, so that the exhaust pipe in the exhaust system becomes relatively high in temperature in low-speed operations in which cooling by means of the outside air such as wind resulting from travelling cannot be much expected, causing discoloration of the film, such as Cr plating, deposited on the outer surface of the exhaust pipe, resulting in deterioration of the commercial value.

SUMMARY OF THE INVENTION

It is, therefore, a primary object of the present invention to provide an exhaust gas cleaning device for an internal combustion engine of a motorcycle wherein such an internal combustion engine starting aid as a choke valve, or by-starter or the like is actuated in the above-mentioned cleaning means, and the supply of the secondary air to the exhaust system is decreased or stopped in low-speed operations during the warming-up of the engine in order to suppress the reaction of the unburnt components such as HC, CO and the like in the exhaust system, thereby to prevent the decoloration of the exhaust pipe.

To this end, the present invention provides an internal combustion engine for use with motorcycles including an intake system, an exhaust system, a starting aid for expediting the engine starting, and an exhaust gas cleaning device adapted to supply secondary air to the exhaust system for cleaning the exhaust gas flowing therethrough. The exhaust gas cleaning device comprises a secondary-air supply passage communicated with the exhaust system, a secondary-air control valve device disposed in the intermediate pair of the secondary-air supply passage and adapted to regulate the flow rate of the secondary air flowing through the supply passage, and a controller connected to the secondary-air control valve device and adapted to close the same on detecting the operation of the starting aid and a vehicle speed below a set value.

The above and other objects, features and advantages of the invention will become apparent from the detailed description of the invention when taken in conjunction with the accompanying drawings.

BRIEF DESCRIPTION OF THE DRAWINGS

FIG. 2 is a vertically-sectioned side elevational view of the exhaust gas cleaning device according to the present invention.

DESCRIPTION OF THE PREFERRED EMBODIMENT

Figure 1:
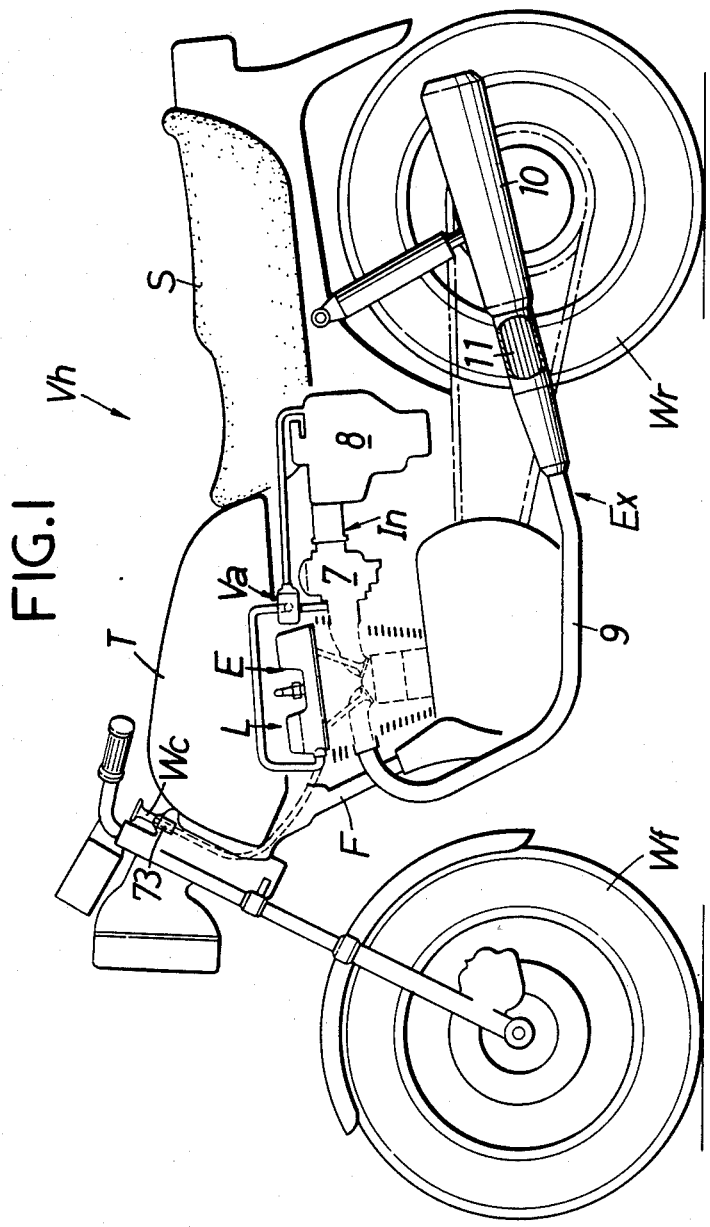
FIG. 1 is a side elevational view of a motorcycle provided with an exhaust gas cleaning device according to the present invention.

A preferred embodiment of the present invention in case where the invention is applied to an internal combustion engine for a motorcycle will be described hereinunder with reference to the accompanying drawings.

In FIG. 1, a fuel tank T and a seat S are supported on the upper part of a frame F of a motorcycle Vh. Moreover, front and rear wheels Wf, Wr are suspended in front and in the rear of the frame F respectively. In the space surrounded by these members, an internal combustion engine E for driving the rear wheel Wr is horizontally mounted on the frame F.

Figure 2:
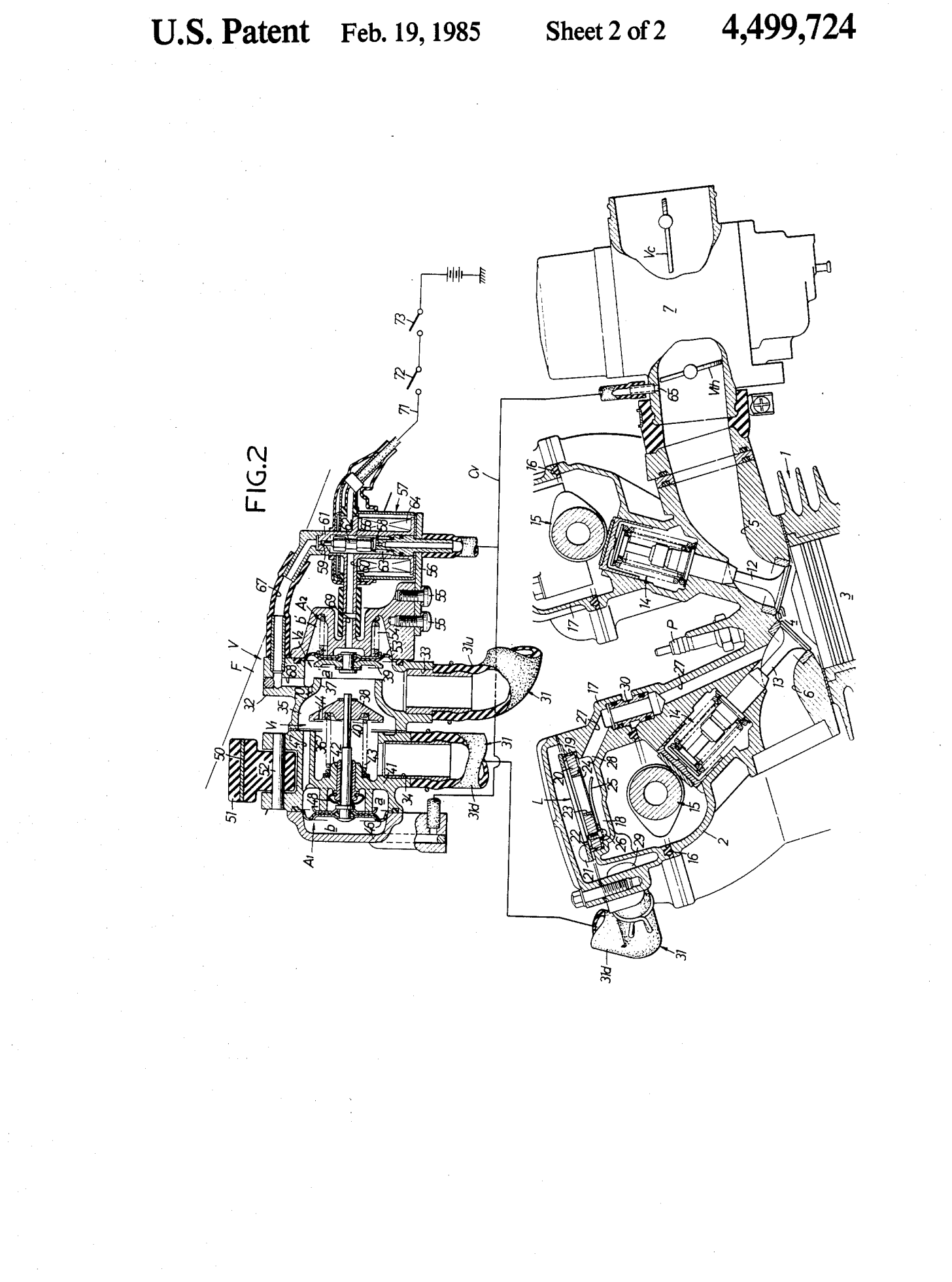

In FIG. 2, an intake port 5 communicated with a combustion chamber 4 above a piston 3 is formed in the rear half of a cylinder head 2 of an engine main body 1, while an exhaust port 6 communicated with the combustion chamber 4 is formed in the front half thereof. The intake port 5 is opened to the rear surface of the engine main body 1, while the exhaust port 6 is opened to the front surface thereof. The intake port 5 is connected with an intake system In having a carburetor 7, an air cleaner 8 and the like disposed in the rear of the engine main body 1 as shown in FIG. 1, while the exhaust port 6 is connected with an exhaust system Ex having an exhaust pipe 9, an exhaust muffler 10 and the like. Moreover, a three-way conversion catalyst 11 (TWC) for cleaning exhaust gas is provided in the intermediate part of the exhaust muffler 10. In addition, the cylinder head 2 is provided with intake and exhaust valves 12, 13 for opening or closing the open ends of the intake and exhaust ports 5, 6 on the side of the combustion chamber 4 as usual and adapted to be operated by cooperation between valve springs 14 and valve-actuating mechanisms 15 respectively. The cylinder head 2 has an ignition plug P disposed between the intake and exhaust valves 12, 13.

An exhaust pulsation pressure responsive type check valve or a reed valve L is provided to a head cover 17 covering the exhaust valve 13 of the cylinder head 2 through a packing material 16.

A valve chest 18 is formed in the head cover 17. A reed valve body 20 is housed therein through a heat resisting packing 19 in the valve chest 18 and secured to the head cover 17 through a mounting plate 22 by means of a screw 21. A valve bore 23 is formed in the reed valve body 20. Moreover, a reed 24 for opening or closing the valve bore 23 and a reed stopper 25 for limiting the opening of the reed 24 are secured to the lower surface of the reed valve body 20 by means of a setscrew 26.

A secondary-air passage 27 is formed extending over the cylinder head 2 and the head cover 17 of the engine main body 1. The upper end of the passage 27 is communicated with an outlet port 28 of the valve chest 18 of the reed valve L, while the lower end thereof is communicated with a portion of the exhaust port 6 close to the exhaust valve 13.

In addition, the portions of the secondary-air passage 27 extending over the cylinder head 2 and the head cover 17 respectively are hermetically connected with each other by means of a connecting tube 30 when the cylinder head 2 and the head cover 17 are assembled together. The connecting tube 30 is used also as a guide member when the cylinder head 2 and the head cover 17 are assembled together.

A secondary-air supply passage 31 communicated with the cleaning chamber of the above-mentioned air cleaner 8 is communicated with an inlet port 29 opened to the valve chest 18 of the reed valve L.

The vacuum produced by the exhaust pulsation pressure in the exhaust port 6 through the operation of the engine E intermittently open the reed 24, so that the secondary air from the air cleaner 8 can be introduced into the exhaust port 6 through the secondary-air supply passage 31, the reed valve L and the secondary-air passage 27.

A secondary-air control valve device V for controlling the flow rate of the secondary air supplied to the exhaust port 6 is provided in the intermediate part of the secondary-air supply passage 31. The control valve device V comprises a first control valve $V_1$ adapted to be closed in a deceleration or snap operation of the engine E so as to substantially cut off the supply of the secondary air to the exhaust system, and a second control valve $V_2$ adapted to be opened when such a starting aid as a choke valve Vc or the like disposed in the intermediate part of the intake system In is actuated in a low-speed operation of the engine E so as to decrease the amount of the secondary air supplied to the exhaust system Ex.

A single valve box 32 for incorporating the first and second control valves $V_1$, $V_2$ is supported by a bracket 50 secured to the frame F, through a rubber mount 51 and a mounting pin 52. The valve box 32 has an inlet port 33 and an outlet port 34 for secondary air opened in parallel with each other. The inlet port 33 is communicated with an upstream-side passage $31u$ of the secondary-air supply passage 31 communicating with the air cleaner 8 (FIG. 1), while the outlet port 34 is communicated with a downstream-side passage $31d$ of the secondary-air supply passage 31 communicating with the reed valve L. A valve passage 35 is formed in the valve box 32, and a first and second valve ports 36, 37 are formed in the valve passage 35. The inlet port 33 and the outlet port 34 are communicated with each other through these valve ports 36, 37.

The first valve port 36 is opened or closed by the first control valve $V_1$, while the second valve port 37 is opened or closed by the second control valve $V_2$.

The structure of the first control valve $V_1$ will be described hereinunder. A first valve body 38 for opening or closing the first valve port 36 is received by the valve passage 35. A valve lever 40 connected to the valve body 38 is reciprocatably supported through a guide sleeve 42 provided on a wall surface 41 in the valve box 32. A valve spring 43 is loaded between the wall surface 41 of the valve passage 35 and the valve body 38 so that the resilient force of the valve spring 43 opens the first valve body 38.

In addition, a leak bore 44 is formed in the first valve body 38 so that even when the first valve body 38 is in a closing state, some secondary air is supplied to the exhaust system Ex through the leak bore 44 via the secondary-air supply passage 31.

A first vacuum actuator $A_1$ is provided in the valve passage 35 through the wall surface 41. The actuator $A_1$ has a diaphragm 46 and an atmospheric pressure chamber a and a vacuum chamber b partitioned thereby. One end of the valve lever 40 is projected into the first vacuum actuator $A_1$ and connected to the diaphragm 46. The atmospheric pressure chamber a is communicated with the upstream-side passage $31u$ through an atmospheric air passage 47 and the valve passage 35, while the vacuum chamber b is communicated with an intake passage on the downstream side from a throttle valve Vth of the carburetor 7 through a vacuum circuit Cv so that the intake vacuum in the intake passage acts thereon.

In the atmospheric pressure chamber a, both ends of a boot 48 made of a flexible material such as rubber, synthetic resin or the like are hermetically connected to an end of the wall surface 41 and an end of the valve lever 40 respectively. The atmospheric pressure chamber a and the valve passage 35 are hermetically shut off from each other by the boot 48 so that the air passing through the gap between the guide sleeve 42 and the valve lever 40 is prevented from flowing into the atmospheric pressure chamber a.

The structure of the second control valve $V_2$ will be described hereinunder. A second vacuum actuator $A_2$ is provided on one side of the valve passage 35 communicated with the secondary-air supply passage 31. The actuator $A_2$ has a diaphragm 53 and an atmospheric pressure chamber a' and a vacuum chamber b' partitioned thereby. The atmospheric pressure chamber a' is communicated with the upstream-side passage $31u$ at all times as well as with the valve passage 35 through the second valve port 37. A second valve body 39 for opening or closing the second valve port 37 is secured to one side surface of the diaphragm 53 facing to the atmospheric pressure chamber a'. A diaphragm spring 54 is loaded in the vacuum chamber b' so as to energize the diaphragm 53 to be displaced toward the second valve port 37. When the vacuum in the vacuum chamber b' rises, the second valve body 39, together with the diaphragm 53, separates from the second valve port 37 against the resilient force of the diaphragm spring 54, opening the second valve port 37.

A stay 56 is secured to one side (right side as viewed in FIG. 2) of the valve box 32 by means of a mounting screw 55. A changeover valve or solenoid valve 57 is supported by the stay 56. The solenoid valve 57 comprises: a valve chest 66 of a valve main body 61 having first and second inlet ports 58, 59 opened facing to each other as well as a single outlet port 60 opened therebetween; a valve body 62 housed in the valve chest 66 and capable of alternately opening and closing the first and second inlet ports 58, 59; a valve spring 63 housed also in the valve chest 66 and adapted to energize the valve body 62 in the closing direction of the second inlet port 59; and a solenoid 64 disposed so as to surround the valve main body 61 and adapted to energize the valve body 62 in the opening direction of the second inlet port 59 against the resilient force of the valve spring 63. The first inlet port 58 is communicated with the vacuum circuit Cv communicating with a vacuum output port 65 opened into an intake passage on the downstream side from the throttle valve Vth of the carburetor 7. On the other hand, the second inlet port 59 is communicated with an atmospheric air passage 67, the other end of which is communicated with the atmospheric pressure chamber a' in the valve box 32 through an atmospheric air inlet port 68 formed in the wall of the valve box 32. Moreover, a leak bore 70 is formed in the wall of the valve box 32. The leak bore 70 is adapted to allow the valve passage 35 and the atmospheric pressure chamber a' to communicate with each other even when the second valve body 39 is in a closing state, thereby to leak the atmospheric air to the side of the valve passage 35.

The outlet port 60 is communicated with the vacuum chamber b' of the second control valve $V_2$ through a passage 69 formed in the valve box 32.

An switch 72 adapted to be opened or closed on detecting a vehicle speed of the motorcycle and an switch 73 adapted to be opened or closed on detecting the operation of a choke valve Vc are connected in series in the intermediate part of a power supply circuit 71 leading to the solenoid 64. The switch 72 is adapted to be closed when the vehicle speed is below a given value (e.g., 20 K/H), while the switch 73 is adapted to be closed when the choke valve Vc is closed. Thus, the solenoid valve 57, the power supply circuit 71 and the switches 72, 73 constitute a controller C for closing the second control valve $V_2$, i.e., a secondary-air control valve device V.

The choke valve Vc is actuated through a choke wire Wc having an operating part mounted on a part of the frame F in front of the fuel tank T so that a driver can easily operate in a riding posture. The switch 73 is incorporated in the intermediate part of the wire Wc so as to be opened or closed on detecting the operation stroke of the wire Wc.

The function of the preferred embodiment of the present invention will be described hereinunder. First, under an operative state of the engine where the choke valve Vc is never closed, when the engine is being decelerated, the throttle valve Vth of the carburetor 7 has a small opening, so that a high intake vacuum (above 450 mmHg) on the downstream side from the throttle valve Vth is applied into the vacuum chamber b of the first control valve $V_1$ through the vacuum circuit Cv. Consequently, the diaphragm 46 is sucked and displaced to the left side as viewed in FIG. 2, causing the first valve body 38 to close the first valve port 36. In this case, a necessary minimum amount of secondary air is supplied to the exhaust port 6 from the leak bore 44 of the first valve body 38 through the downstream-side passage 31d. This is, however, only such an extent that the combustion of unburnt components is promoted. Therefore, substantially no secondary air is supplied to the exhaust port 6, so that after-burning is prevented. In this case, when the atmosphere of the three-way conversion catalyst 11 becomes close to a stoichiometric ratio, the catalyst 11 performs reduction and oxidation, cleaning HC, CO and $NO_x$ in exhaust gas.

When the engine enters a normal operation range, the intake vacuum after the throttle valve Vth gradually lowers, and also the vacuum in the vacuum chamber b lowers, causing the first valve body 38 to be brought into an open state by the resilient force of the valve spring 43, thereby to maintain the first valve port 36 to be open. In addition, because the switch 73 which is closed when the choke valve Vc is closed is opened, the valve body 62 of the solenoid valve 57 keeps closing the second inlet port 59 independently of the state of the switch 72 which detects the vehicle speed. Consequently, the vacuum on the downstream side from the throttle valve Vth is applied into the vacuum chamber b' of the second control valve $V_2$ through the vacuum circuit Cv, the first inlet port 58 and the outlet port 60, causing the second valve body 39 to be brought into an open state against the valve spring 54 (the second valve body 39 is set so as to be brought into an open state by a vacuum above 95 mmg), so that also the second valve port 37 is kept open.

Accordingly, since in a normal operation range of the engine E, both the valve ports 36, 37 of the first and second control valves $V_1$, $V_2$ respectively are open, the secondary-air supply passage 31 is made communicatable, allowing the reed valve L to communicate with the atmospheric air through the air cleaner 8 (in FIG. 1).

On the other hand, the exhaust pulsation pressure generated by the operation of the internal combustion engine E reaches the reed valve L through the secondary-air passage 27 and opens the valve L, so that the clean air from the air cleaner 8 is led to the reed valve L through the secondary-air supply passage 31 and the secondary-air control valve gear V in an open state as described above, and introduced to the exhaust port 6 therefrom through the secondary-air passage 27.

The secondary air introduced into the exhaust port 6 is mixed into exhaust gas so as to partially oxidize the HC and CO, mixed in the exhaust gas, in the exhaust port 6 and the exhaust pipe 9. Moreover, the exhaust gas mixed with the secondary air is supplied to the three-way conversion catalyst 11 from the exhaust muffler 10, making the atmosphere of the catalyst 11 oxidative, thereby allowing the catalyst 11 to function as an oxidative catalyst which converts mainly CO and HC in exhaust gas into $CO_2$ and $H_2O$ through oxidation.

When the opening of the throttle valve Vth of the engine E is increased and the engine enters into acceleration and high-speed operation ranges, the vacuum in the intake passage on the downstream side from the throttle valve Vth decreases. Consequently, the vacuum applied into the vacuum chamber b' of the second control valve $V_2$ through the solenoid valve 57 becomes low (below 95 mmHg), so that the diaphragm 53 is displaced to the left side as viewed in FIG. 2 by the resilient force of the diaphragm spring 54, causing the second valve body 39 to close the second valve port 37.

Thus, since the second valve port 37 of the second control valve $V_2$ is closed by the second valve body 39, the greater part of secondary air is not supplied to the exhaust system Ex, but a necessary minimum amount of secondary air is allowed to flow to the downstream-side passage 31d only from the leak bore 70 through the first valve port 36 and supplied to the exhaust port 6.

Accordingly, in the acceleration and high-speed operation ranges, almost no secondary air is supplied to the exhaust system Ex, thereby allowing the atmosphere of the three-way conversion catalyst 11 to be reductive, so that $NO_x$ much generated mainly in the above-mentioned operation ranges can be converted into harmless $N_2$ and $O_2$ through reduction and removed. Next, in warming up of the engine where the choke valve Vc is actuated, the switch 73 is closed, and when the vehicle speed is below a set value (20 K/H), the switch 72 of the vehicle sensor is closed. Consequently, the solenoid 64 of the solenoid valve 57 is excited, so that the valve body 62 is attracted toward the lower side as viewed in FIG. 2, closing the first inlet port 58 while opening the second inlet port 59 simultaneously. Therefore, the atmospheric air in the atmospheric air chamber a' is allowed to flow into the vacuum chamber b' of the second control valve $V_2$ through the atmospheric air inlet port 68, the atmospheric air passage 67 and the solenoid valve 57, so that the diaphragm spring 54 displaces the second valve body 39 together with the diaphragm 53 toward the left side as viewed in FIG. 2, thereby to close the second valve port 37 and consequently shut off the secondary-air supply passage 31.

Accordingly, in the low-speed operation range of the engine where the exhaust system Ex is not sufficiently cooled by the wind resulting from travelling, the thick unburnt components, HC and CO, discharged to the exhaust system Ex react only with the secondary air supplied to the exhaust port 6 only from the leak bore 70. Therefore, there is no possibility of decoloration of the exhaust pipe even if exhaust system Ex is not sufficiently cooled.

Next, when the vehicle speed exceeds the set value (20 K/H), the switch 72 is opened. Consequently, the solenoid 64 of the solenoid valve 57 is demagnetized, so that the valve body 62 is energized by the valve spring 63 so as to close the second inlet port 59. Therefore, the second valve body 39 is released from the closing state in response to the intake vacuum applied into the vacuum chamber b'. At this time, the thick unburnt components, HC and CO, discharged to the exhaust system Ex actively react with the secondary air supplied to the exhaust port 6, causing the temperature of the exhaust pipe 9 to rise. There is, however, no possibility of decoloration of the exhaust system because it is cooled by the sufficiently high wind resulting from traveling.

It is to be noted also that the above-mentioned preferred embodiment may be modified so that the secondary-air supply passage 31 is completely shut off when the second control valve $V_2$ is closed. Moreover, the above-mentioned switch 73 may be adapted to be closed by the operation of the bystarter instead of the choke valve Vc.

As will be fully understood from the foregoing description, according to the present invention, in the exhaust gas cleaning system adapted to supply secondary air to the exhaust system of the internal combustion engine for cleaning the exhaust gas flowing therethrough, the secondary-air control valve device for regulating the flow rate of the secondary air flowing through the secondary-air supply passage is provided in the intermediate part of the secondary-air supply passage communicated with the exhaust system, and the control valve device is connected with the controller which closes the above-mentioned secondary-air control valve device on detecting the operation of such a starting aid as the choke valve or the like provided in the intake system of the engine and a vehicle speed below the set value. Therefore, when such a starting aid as the choke valve or the like is in an operative state and the vehicle speed of the motorcycle is below the set value, the flow rate of the secondary air supplied to the exhaust system is decreased or the supply thereof is shut off. Accordingly, it is possible to prevent the decoloration of the exhaust pipe and the exhaust muffler in the exhaust system due to heat and prolong the life of the exhaust system. In addition, there is no possibility of damaging the external appearance of the whole of the motorcycle, so that its commercial value can be maintained over a long period of time.

Furthermore, there is no adverse effect on a high efficiency of cleaning exhaust gas, since the supply of secondary air to the exhaust system is immediately started when the operation of such a starting aid as the choke valve is stopped and the vehicle speed of the motorcycle exceeds the set value so that the exhaust pipe and the exhaust muffler in the exhaust system are sufficiently cooled by the wind resulting from traveling.

What is claimed is:

1. An internal combustion engine for use with motorcycles comprising:
   an intake system;
   an exhaust system;
   a carburetor disposed in said intake system;
   a starting aid for expediting the engine starting; and
   an exhaust gas cleaning means for supplying secondary air to said exhaust system to clean the exhaust gas flowing therethrough, said exhaust gas cleaning means comprising
   (a) a secondary-air supply passage communicated with said exhaust system, and
   (b) a secondary-air control valve device disposed in an intermediate portion of said secondary-air supply passage to regulate the flow rate of the secondary air flowing through said secondary-air supply passage, said secondary-air control valve device including first and second control valves disposed in said secondary-air supply passage, said first and second valve operation mechanisms associated with said second control valve, wherein said first control valve is closed at the time of deceleration of the engine by detecting intake vacuum in said intake system downstream of said carburetor whereas said second control valve is closed by said first valve operation mechanism on detecting the actuation of said starting aid and a vehicle speed below a set value; said second control valve is also closeable by said second valve operation mechanism in acceleration and high-speed operation ranges by detecting the intake vacuum in the intake system downstream of said carburetor.

2. A device as claimed in claim 1, wherein said second control valve includes a valve member disposed in said secondary-air supply passage and movable in response to vacuum pressure, a vacuum chamber for receiving a vacuum to actuate the valve member, and a communication passage having one end communicated with said vacuum chamber, the other end of said communication passage leading to one end of a vacuum passage communicating with said intake system at a point downstream from said carburetor and also to one end of an atmospheric air passage communicating with said secondary-air supply passage, and wherein a changeover valve is mounted so as to be actuated on detecting the actuation of said starting aid and a vehicle speed below said set value thereby to place said communication passage in communication with either said vacuum or said atmospheric air passage.

3. An exhaust gas cleaning device for an internal combustion engine of a motorcycle as defined in claim 1, wherein said starting aid comprises a choke valve provided in said intake system.

4. An exhaust gas cleaning device for an internal combustion engine for a motorcycle as defined in claim 1, wherein said starting aid comprises a by-starter.

* * * * *